T. J. BROWN.
Mole-Traps.
No. 133,407. Patented Nov. 26, 1872.
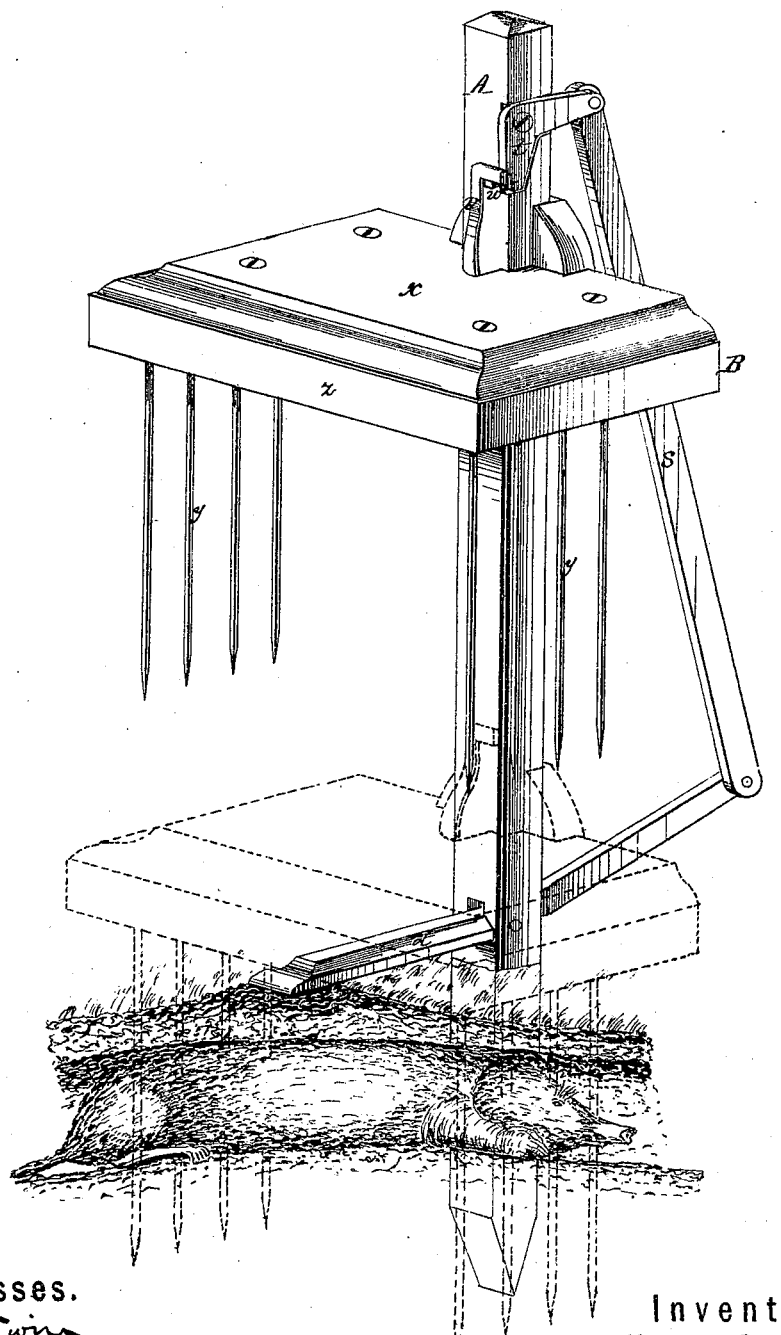
Witnesses.
Jas. L. Ewin
Walter Allen
Inventor.
Thos. J. Brown
By Knight Bros
Attys

UNITED STATES PATENT OFFICE.

THOMAS J. BROWN, OF TARRYTOWN, NEW YORK.

IMPROVEMENT IN MOLE-TRAPS.

Specification forming part of Letters Patent No. 133,407, dated November 26, 1872; antedated November 23, 1872.

*To all whom it may concern:*

Be it known that I, THOMAS J. BROWN, of Tarrytown, in the county of Westchester and State of New York, have invented an Improved Mole-Trap, of which the following is a specification:

This invention relates to a trap of the form in which the mole is pierced and instantly killed by means of prongs projecting from a dead-fall set over the path or burrow, and sprung by the animal in an attempt to re-elevate its depressed ridge. The trap has a single standard or stake, a weighted slide or fall, a catch and latch, and a lever, bell-crank, and connecting-rod to trip the latter, constructed, arranged, and operating as hereinafter set forth.

In the accompanying drawing, the figure is a perspective of the trap in use; the operation being illustrated by a sectional view of a portion of the burrow or path with mole in same, and by dotted outline of the sprung dead-fall.

A represents a square wooden standard or stake adapted to be readily set in the ground, and B the slide or dead-fall which partially embraces the single standard A at one side so as to project laterally and in horizontal position therefrom. This slide or "fall" is composed of a wooden base-plate, $z$, with prongs $y$ set therein, and a top plate or weight, $x$, of cast-iron or other heavy material. The prongs $y$ are preferably arranged in two rows at the ends of a slide of proper length, as represented, but this is not essential. $w$ represents a stud projecting from the standard A at its upper end; and $v$, a spring-latch on the fall B, to engage with the same, to support the slide B while it is set. $u$ represents a horizontal lever pivoted in the standard A immediately above its surface-line, so as to project under the fall B, to constitute the trigger, and extended behind the standard. $t$ represents a bell-crank arranged at the upper end of the standard A so as to engage with the latch $v$ to trip the same; and $s$, a connecting-rod between said trigger and tripper.

The manner of setting the trap and its operation are clearly illustrated in the figure.

The elevation of the trigger $u$ acts through the rod $s$ on the tripper $t$ and the latter disengages the latch $v$ from the catch $w$. The slide or fall thus released descends with great force under the gravity of the weight $x$, driving the prongs $y$ through the roof of the burrow into and through the mole, instantly killing it.

What is claimed as new herein is—

The fall B, sliding on the standard A and provided with a weighted top plate, $x$, and prongs $y$ $y$, and having a spring-latch, $v$, attached thereto, in combination with the bent arm $u$, connecting-rod $s$, bell-crank $t$, and stud $w$, all constructed, arranged, and operated as set forth.

THOMAS J. BROWN.

Witnesses:
JAS. C. AYSER,
ASBERRY MERRITT.